Patented May 13, 1941

2,241,791

UNITED STATES PATENT OFFICE 2,241,791

HYDROUS SILICATE GELS AND METHOD OF MAKING THE SAME

Ernest Wayne Rembert, Plainfield, N. J., assignor to Johns-Manville Corporation, New York, N. Y., a corporation of New York No Drawing. Application July 7, 1939, Serial No. 283,138

9 Claims. (Cl. 23—110)

This invention relates to a method of making hydrous silicates and particularly relates to a method of producing such hydrous silicates by means of a reaction between a soluble salt of an alkaline earth metal such as magnesium and a soluble silicate in an aqueous slurry.

The products of this invention are hydrous silicates. The only gel having adsorptive properties which has been developed heretofore, is the well-known silica gel but the hydrous silicates of this invention although partaking of the nature of gels, differ very appreciably from silica gel. Furthermore, it has been found that the presence of silica gel in the product is detrimental. The hydrous silicates produced in accordance with the method of this invention have much greater adsorptive properties for most purposes, and in particular for decolorizing mineral oils and the like, than silica gel and a much wider variation in properties of the silicates possibly due to the variety of bases or salts which may be employed in the reaction. Furthermore, it has been discovered that the reaction should be carried out under particular conditions of time, proportions and alkali concentration so as to produce hydrous silicates having the most effective adsorption characteristics.

It has also been discovered that the hydrous silicates made as described hereinbefore must contain certain optimum percentages of combined water in order to obtain maximum decolorizing efficiency.

It is an object of this invention to disclose and provide an improved method of producing hydrous silicate products of soluble alkali earth metals. Another object is to disclose and provide an improved method of producing hydrous magnesium silicates having superior adsorptive properties. A still further object of this invention is to provide an improved method of making hydrous silicates having adsorptive properties from water soluble silicates, such hydrous silicate products being substantially free from silica gel. A still further object of this invention is to provide an improved method utilizing certain definite molal ratios, temperatures, pressures, concentration, times, and other conditions whereby the most effective forms of hydrated silicates of alkaline earth metals may be produced in finely divided form from soluble salts and compounds of alkaline earth metals and water soluble silicates.

These, and other objects, uses and advantages of this invention will become apparent to those skilled in the art from the following detailed description of the invention.

In general, the method of this invention may be carried out by forming a solution in water of a salt of an alkaline earth metal and then slowly adding thereto a water soluble silicate such as sodium silicate in aqueous solution preferably with accompanying agitation. The solution may be heated in order to facilitate the reaction. The characteristics of the resulting silicate may be varied by varying the character of the salt used and also by varying the rate at which the soluble silicate is added to such slurry, by altering the proportions of the reacting material present in the reaction mixtures and by the control of other reacting conditions such as temperatures.

It has been found that if the water soluble silicate is added en masse or rapidly to the solution of the soluble salt and water a hydrous silicate is formed but such product is dense, granular, and of very low efficiency insofar as its adsorptive quality is concerned. Similarly, an inefficient product is generally produced by adding the solution of a compound or salt of an alkaline earth metal to the soluble silicate solution. It has been ascertained that these undesirable results are due to the presence during a given portion of the reaction period of an excessive amount of the soluble silicate. If, however, the soluble silicate is slowly added to the solution of metallic compound or salt in water, an active adsorbent of much lower density and of much better structure is obtained. In general, it has been found highly desirable to have the addition of the soluble silicate in aqueous solution to the salt in water to cover a period of at least one hour, very good results being obtained when the period of addition consumes three to five hours. The rate of addition, therefore, is of great importance and should be kept clearly in mind. The addition of the soluble silicate is made continuously, or in successive increments over this period, the quantity added at any given time being varied according to the particular reactions and reacting conditions employed. In general, it has been found that very satisfactory results are obtained by adding the required quantity of soluble silicate at a uniform rate over the reaction period.

Any freely soluble salt or compound of an alkaline earth metal may be used although the soluble salts and compounds of magnesium, particularly magnesium sulphate or chloride, are preferred. When magnesium compounds are employed the molal ratio between MgO and $SiO_2$ should preferably be in the range of 0.3–1.0 to 1.0, although higher or lower ratios may be used if a product of different characteristics and for other uses is desired. For normal purposes a molal ratio of 0.5 produces very good results.

The soluble silicate employed in the reaction may either be a commercial grade of sodium silicate or potassium silicate in concentrated aqueous solution or diluted. A sodium silicate containing one mole of $Na_2O$ to 3.34 of $SiO_2$ has been found to give good results. Also, a sodium silicate containing one mole of $Na_2O$ to 2.04 moles of $SiO_2$ has given a very satisfactory product.

In the preparation of certain hydrous silicates it has been found desirable to introduce a porous carrier material such as finely divided pumice or diatomaceous earth. Such finely divided pumice or diatomaceous earth may be added to the basic materials in the aqueous solution or it may be mixed with the water soluble silicate before its addition to the soluble alkaline earth compound solution.

As stated hereinbefore, it is important in order to develop hydrous silicate gels of optimum adsorptive properties, to add the soluble silicate to the solution slowly with continuous agitation. For example, rapid addition will produce a hard granular hydrous silicate containing appreciable quantities of silica gel which exhibits a low adsorptive efficiency when an attempt is made to use such silicate for decolorizing mineral oils. If, on the other hand, the silicate is added over a period of about four hours with agitation, a very active hydrous silicate is obtained, but which is less dense and possesses an adsorption efficiency higher than any other materials available for petroleum decolorization at the present time.

The slow or gradual addition of soluble silicate to the solution is desired so as to form the desired structure in the product. The time consumed in making such addition may vary with the solubility of the compound of alkaline earth metal dissolved in the reacting medium and the concentration of the soluble silicate which is added.

After the reaction has been completed the suspension of hydrous silicate is filtered, settled, thickened, or otherwise treated so as to separate the reaction product or hydrous silicates in finely divided form from the aqueous medium of the suspension.

The hydrous silicates resulting from the reaction may be washed with water in any suitable manner as for example, by being reslurried and refiltered. It has been found that by treating the hydrous silicate reaction products with a dilute acid solution preferably by slurrying the product with an acid solution of a concentration just sufficient to neutralize the free alkali, the adsorption efficiency of the product is enhanced.

Care should be taken in drying the hydrous silicate products of this invention. It has been found that it is desirable to retain in the material at least 5% of combined water in order to produce adsorbents of optimum efficiency. The product may be dried to a water content of about 20% without substantially impairing its effectiveness as an adsorbent. In drying, therefore, substantially only the free water should be removed in most instances.

The method of manufacturing the products made in accordance with this invention and their effectiveness, will be further apparent from a consideration of the following specific examples:

A solution containing 203.3 grams of magnesium chloride ($MgCl_2.6H_2O$) dissolved in 1,000 ccs. of water was prepared. Another solution containing 500 grams of sodium silicate containing 6.4% $Na_2O$ and 24.7% $SiO_2$, dissolved in 2,500 ccs. of water was also prepared. The sodium silicate solution was then added to the magnesium chloride solution, while being heated at about 200° F., over a period of time requiring five hours for the addition of the 2,500 ccs. of sodium silicate solution. The precipitated magnesium product was immediately filtered from the solution, washed and dried.

A cylinder stock oil derived from Pennsylvania crude having a gravity of 25.6° A. P. I.; a viscosity of 152 seconds at 150° F., and a color of 140 (½ inch dilute Lovibond) or dark, as determined by the A. S. T. M. method was treated with the prepared hydrous magnesium silicate product using one pound of dry magnesium silicate product to one gallon of oil. The oil was decolorized to give a final color of 4⅝, indicating a very high efficiency of the hydrous magnesium silicate as a decolorizing agent.

A second magnesium silicate product was prepared in the same manner as the product described above, excepting in that the silicate solution was added to the magnesium chloride solution at the rate of 500 ccs. per minute or in a total of five minutes while the solution was heated at 200° F. A cylinder stock oil derived from a Pennsylvania crude as described above, upon being treated with this product, using one pound of dry magnesium silicate product to one gallon of oil, was decolorized to give a final color of 5⅝, indicating an efficiency of 67% of the decolorizing power of the product in which the time of addition of the sodium silicate solution to the magnesium chloride solution was five hours.

In a third magnesium silicate product prepared in the same manner as described above, but in which the addition time of the sodium silicate solution to the magnesium chloride solution was one hour instead of five hours, and used to decolorize cylinder stock oil having the same specifications as indicated above, the oil was decolorized giving a final color of 5. This indicated an efficiency of 80% as compared to the product obtained through the addition of the silicate solution to the magnesium solution during a five hour time interval.

In all of the above examples, the magnesium silicate product was dried with care. The product may be dried to a water content of about 15 to 20% without substantially impairing its effectiveness as an adsorbent. In drying, therefore, substantially only the free water should be removed in most instances. The decolorizing test of the oil was made in each case after the oil was heated to a temperature of about 400° F. for a period of ten minutes.

Products made in accordance with this invention may be employed for the decolorization of numerous liquids such as animal oils, vegetable oils and mineral oils. Furthermore, they may be employed as selective adsorbents for the treatment of gas mixtures. It has been found that when decolorization of petroleum oils is effected by these products, much less oil is lost by adsorption than when adsorbents such as fuller's earth are employed. Furthermore, it has been found that the bleach obtained by the use of hydrous silicates made in accordance with this invention is stable and the color does not revert upon standing.

It will be apparent to those skilled in the art that numerous changes and modifications can be made and as a result of such changes and modifications, give rise to silicate products of different physical properties. In this manner the physical characteristics of the products can be varied depending upon the use to which they are to be put. The changes may comprise variation in the type or character of a compound or salt or alkaline earth metal used as one of the raw materials, variation in the rate at which the soluble silicate is added to the suspension or solution, variation in the effective soluble silicate concentration in the reactive medium during reaction and variation in the degree or extent of drying or acid treatment of the product.

This application is a continuation in part of application Serial No. 18,885 filed April 29, 1935, and of Patent No. 1,999,210, granted April 30, 1935.

All such changes and modifications as come within the scope of the appended claims are embraced thereby.

I claim:

1. In a process of producing insoluble silicates, the steps of forming a solution of a freely soluble compound of an alkaline earth metal in an aqueous solution and slowly adding a soluble silicate to such medium to form a silicate of such metal, the rate of addition of the soluble silicate being such as to maintain its concentration below that concentration at which an insoluble silicate having a dense granular structure and low adsorption efficiency is formed, said rate of addition being extended over a period of time of not less than one hour.

2. In a process of producing insoluble silicates, the steps of forming a solution of a freely soluble compound of magnesium in an aqueous medium, and slowly adding a soluble silicate to such medium through a period of not less than one hour to form a silicate of such metal, said soluble silicate being added in quantities sufficient to provide a molal ratio in the silicate product of magnesia to silica of about .3–1.0 to 1.

3. In a process of producing insoluble silicates, the steps of forming a solution of magnesium sulphate, and slowly adding a soluble silicate through a period of not less than one hour to such medium to form a silicate of such metal, said soluble silicate being added in quantities sufficient to provide a molal ratio in the silicate product of magnesia to silica of about .3–1.0 to 1.

4. In a process of producing hydrous silicates having adsorptive properties, the steps of forming a solution of a freely soluble alkaline earth metallic compound capable of forming an insoluble silicate by interaction with a soluble silicate in an aqueous medium, slowly adding a soluble silicate through a period of not less than one hour to said soluble metallic compound, agitating the suspension during such addition, and separating solid reaction products from the aqueous medium.

5. In a process of producing hydrous magnesium silicates having adsorptive properties, the steps of forming a solution of a freely soluble magnesium compound capable of forming an insoluble silicate by interaction with a soluble silicate in an aqueous medium, slowly adding a soluble silicate through a period of not less than one hour to said magnesium compound solution to form an insoluble hydrous magnesium silicate, agitating the suspension during such addition, and separating solid reaction products from the aqueous medium.

6. In a process of producing hydrous magnesium silicates having adsorptive properties, the steps of forming a solution of a freely soluble magnesium compound capable of forming an insoluble silicate by interaction with a soluble silicate, slowly adding a soluble silicate through a period of not less than one hour to said magnesium compound solution to form an insoluble hydrous magnesium silicate, then washing the insoluble silicate with water and treating the washed silicate with a dilute acid solution to neutralize free alkalis, and separating solid reaction products from the solution.

7. In a process of producing hydrous magnesium silicates having adsorptive properties, the steps of forming a solution of a freely soluble magnesium compound capable of forming an insoluble silicate by interaction with a soluble silicate in an aqueous medium, slowly adding a soluble silicate in successive increments through a period of not less than one hour to said solution, separating solid reaction products from the aqueous medium, and treating the solid products with an acid to neutralize free alkalis.

8. In a process of producing hydrous magnesium silicates having adsorptive properties, the steps of forming a solution of a freely soluble magnesium compound capable of forming an insoluble silicate by interaction with a soluble silicate in an aqueous medium, slowly adding a soluble silicate in successive increments to said solution through a period of not less than one hour, said soluble silicate being added in quantities sufficient to provide a molal ratio in the silicate product of magnesia to silica of about 0.3–1.0 to 1.

9. In a process of producing hydrous magnesium silicates having adsorptive properties, the steps of forming a solution of a freely soluble magnesium compound capable of forming an insoluble silicate by interaction with a soluble silicate in an aqueous medium, slowly adding a soluble silicate in successive increments through a period of not less than one hour to said solution, heating and agitating the solution during such addition, separating solid reaction products from the aqueous medium, and washing said solid reaction products.

ERNEST WAYNE REMBERT.